US010439876B2

(12) United States Patent
Kaluza et al.

(10) Patent No.: US 10,439,876 B2
(45) Date of Patent: Oct. 8, 2019

(54) SYSTEM AND METHOD FOR DETERMINING INFORMATION TECHNOLOGY COMPONENT DEPENDENCIES IN ENTERPRISE APPLICATIONS BY ANALYZING CONFIGURATION DATA

(71) Applicant: E.S.I. SOFTWARE LTD., Rosh HaAyin (IL)

(72) Inventors: Bostjan Kaluza, Ljubljana Polje (SI); Mojca Komavec, Borovnica (SI); Eyal Oz, Petah Tikva (IL); Alexander Sasha Gilenson, Givatayim (IL)

(73) Assignee: E.S.I. SOFTWARE LTD, Rosh Haayin (IL)

( * ) Notice: Subject to any disclaimer, the term of this patent is extended or adjusted under 35 U.S.C. 154(b) by 42 days.

(21) Appl. No.: 15/704,058

(22) Filed: Sep. 14, 2017

(65) Prior Publication Data

US 2019/0081861 A1    Mar. 14, 2019

(51) Int. Cl.
*H04L 12/24* (2006.01)
*G06N 7/00* (2006.01)

(52) U.S. Cl.
CPC ......... *H04L 41/0866* (2013.01); *G06N 7/005* (2013.01); *H04L 41/0853* (2013.01); *H04L 41/12* (2013.01); *H04L 41/5058* (2013.01); *H04L 41/08* (2013.01); *H04L 41/0843* (2013.01); *H04L 41/16* (2013.01)

(58) Field of Classification Search
CPC ...... H04L 41/0866; H04L 41/08; H04L 41/12
See application file for complete search history.

(56) References Cited

U.S. PATENT DOCUMENTS

| 9,524,465 B2 | 12/2016 | Gilenson et al. |
| 2010/0293168 A1* | 11/2010 | Gupta ................. G06F 9/44505 707/748 |
| 2013/0325899 A1 | 12/2013 | Mohaban et al. |
| 2013/0332590 A1 | 12/2013 | Mohaban et al. |

* cited by examiner

*Primary Examiner* — Nam T Tran
(74) *Attorney, Agent, or Firm* — Soroker Agmon Nordman

(57) ABSTRACT

A method of determining component dependencies in an enterprise application architecture implemented over an enterprise network, including identifying structures of hosts connected to the network; wherein the structures includes applications executed by the host, obtaining configuration parameters from said hosts, determining dependencies between applications of hosts based on the configuration parameters, receiving a template for identifying dependencies between components in the enterprise network, identify candidate mappings of hosts based on the template, further identifying candidate mappings of host pairs based on the determined dependencies between hosts and the template, analyzing the candidate mappings to calculate a probability score for the candidate mappings, output the candidate mappings having the highest score.

19 Claims, 6 Drawing Sheets

SYSTEM AND METHOD FOR DETERMINING INFORMATION TECHNOLOGY COMPONENT DEPENDENCIES IN ENTERPRISE APPLICATIONS BY ANALYZING CONFIGURATION DATA

TECHNICAL FIELD

The present disclosure relates generally to computerized management of information technology (IT) systems in a computerized organization and more specifically to determining dependencies between components of the systems.

BACKGROUND

Over the past decades information technology (IT) systems have evolved and increased in complexity. Many years ago a company would use a single computer with a single operating system and small number of programs to supply the computational needs of the company. Nowadays enterprise companies may have hundreds and thousands of computers interconnected over a network.

Large enterprises rely on data centers comprising a vast number of servers and associated components, such as networking equipment, storage units, cooling systems, and power supplies. Servers host a plethora of business applications that empower business processes, execute business transaction, and serve consumer applications. Companies aim to have these applications reliable and responsive in order to deliver the services according to a specific Service Level Agreement (SLA). To implement the SLA, companies engage into problem management process dedicated to address emerging issues in IT environments. The process comprises problem detection, categorization, prioritization, diagnosis, root cause analysis, resolution, evaluation, and proactive remediation.

One of the key aspects to effectively and efficiently resolve problems is a detailed understanding of the IT environment. Multi-tiered enterprise application may include a plethora of heterogeneous components at various layers of the information technology stack spread over multiple physical hosts. The components typically depend on each other, meaning that a change in configuration parameter at one component might affect behavior of another component or even cause it to stop working. Keeping track of these dependencies is a challenge as they change over time, contain cross-product and cross-host dependencies, and require in-depth expert knowledge.

U.S. Pat. No. 9,524,465 to Gilenson et al (Dec. 20, 2016) discloses a system and method for analyzing and prioritizing changes and differences to configuration parameters in IT systems, the disclosure of which is incorporated herein by reference.

One approach for detecting dependencies is set forth for example in U.S. Patent publications to Mohaban et al US2013/0325899A1 (Dec. 5, 2013) and US2013/0332590A1 (Dec. 12, 2013), which disclose a top-down discovery process, where a single entry point is specified to identify a relevant process and an application with which that entry point is associated. Typically, it is sufficient for the entry point to be associated with a hostname or IP address and port numbers; in some applications, the entry point may be associated with a URL. Typically, discovery starts from the entry point and each of one or more software applications of interest.

An alternative approach is described in U.S. Patent publication to Gupta et al. US2010/0293168A (Nov. 18, 2010), which discloses a bottom-up approach for determining configuration parameters dependencies via analysis of configuration data from multi-tiered enterprise applications. The approach focuses on identifying a candidate set of configuration dependencies in a rank-ordering list. The approach is concerned with identifying dependency between parameters belonging to different IT components such that either both parameters have the same value or one is a substring of the other. Such candidate dependencies are then ranked according to the frequency, the number of hits on google, etc.

SUMMARY

An aspect of an embodiment of the disclosure relates to a system and method for determining component dependencies in an enterprise network. Initially, hosts participating in the network are identified and configuration parameters are collected from the hosts, for example by installing an agent application on each host. The configuration parameters are analyzed to determine dependencies between components of one host and components of another host.

A template is designed to serve as a generic map of dependencies between components in an enterprise application software.

A computer server accepts the host information, the configuration parameter information and the host dependency information. The server further receives the template and attempts to map the hosts and their components to match the details in the template. The server initially maps a host to various candidate positions in the template. Then the server attempts to map hosts that form pairs with the first host by depending from the first host or that the first host depends from them.

After forming a list of candidate mappings the server examines each candidate mapping and provides a probability score for the correctness of each mapping. The mappings with the highest score are assumed to be the most accurate. Thus when a problem occurs in an application in the enterprise network, applications which the application with the problem depend from may be identified and examined.

There is thus provided according to an exemplary embodiment of the disclosure, a method of determining component dependencies in an enterprise application architecture implemented over an enterprise network, comprising:

Identifying structures of hosts connected to the network; wherein the structures includes applications executed by the host and their components;

Obtaining configuration parameters from said hosts;

Determining dependencies between hosts based on the configuration parameters;

Receiving a template for identifying dependencies between components in the enterprise application architecture;

Identifying candidate dependency mappings of components based on the template;

Further identifying candidate mappings of component pairs based on the determined dependencies between hosts and the template;

Analyzing the candidate mappings to calculate a probability score for the candidate mappings:

Output the candidate mappings having the highest score.

In an exemplary embodiment of the disclosure, the determined dependencies between hosts are analyzed to identify reverse dependencies. Optionally, identifying dependencies between hosts is based on predefined rules applied to the configuration parameters. In an exemplary embodiment of the disclosure, different templates are used for different enterprise architectural patterns. Optionally, some candidate mappings of hosts are ruled out due to a disagreement between the template and host pairs that depend from the mapped host. In an exemplary embodiment of the disclosure, the probability score is affected by the mappings corresponding to dependencies of applications that are on the same host relative to dependencies of components that are executed on more than one host. Optionally, the probability score is affected by rarity of the name of the underlying components. In an exemplary embodiment of the disclosure, the probability score is calculated by a machine learning algorithm. Optionally, the candidate mappings are used to signify what components should be repaired or reinstalled.

There is further provided according to an exemplary embodiment of the disclosure, a non-transitory computer readable medium for storing program code to execute the method described above.

There is further provided according to an exemplary embodiment of the disclosure, a system for determining component dependencies in an enterprise application architecture implemented over an enterprise network, comprising:

An agent application configured to collect configuration parameters of applications executed on hosts and their components connected to the enterprise network;

A database configured to store the collected configuration parameters;

A template of component dependencies in the enterprise application architecture;

A server configured to perform the following:
a. identify structures of hosts; wherein the structures includes applications executed by the host and their components;
b. determine dependencies between components of hosts based on the configuration parameters;
c. identify candidate mappings of hosts based on the template;
d. further identify candidate mappings of host pairs based on the determined dependencies between hosts and the template;
e. analyze the candidate mappings to calculate a probability score for the candidate mappings;
f. output the candidate mappings having the highest score.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
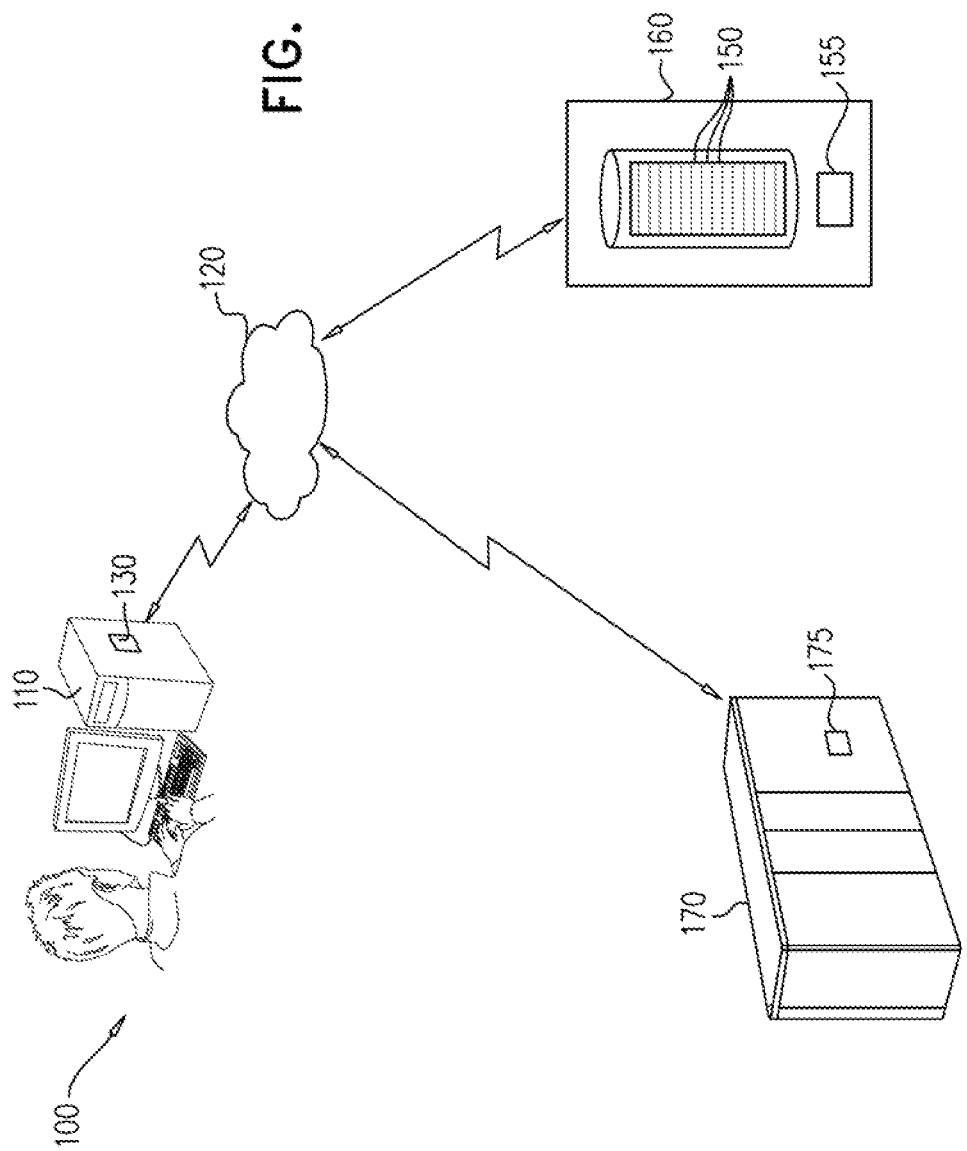
FIG. 1 is a schematic illustration of a network of computers connected in an information technology system, according to an exemplary embodiment of the disclosure.

FIG. 1 is a schematic illustration of a network of computers connected in an information technology system 100, according to an exemplary embodiment of the disclosure. In an exemplary embodiment of the disclosure, IT system 100 includes multiple hosts 110 connected over a network 120. Optionally, each host 110 may serve as a workstation for accessing servers or may be a server for providing services to users of workstations. Network 120 may be a local area network (LAN), a wide area network (WAN) (e.g. the Internet) or any other type of network over which hosts 110 may communicate. Optionally, each host 110 executes an agent application 130 for monitoring and collecting information at the host 110. The collected information includes configuration parameters 150 relating to the hardware and software installed in the hosts 110 of IT system 100. Optionally, the configuration parameters 150 may be collected periodically or upon occurrence of a change to the configuration parameters 150. In some embodiments of the disclosure, the configuration parameters may be collected on specific hosts 110, for example only on servers or only on specific servers that are important to IT system 100.

The hosts 110 may be any type of general purpose computer including a processor and memory. Optionally, they may be standard desktop computers, dedicated server computers, rack mount computers, laptop computers, mobile devices, and network devices such as a switch, router, load balancer or any other type of network component.

In an exemplary embodiment of the disclosure, the information collected by agent application 130 is stored in a database 160. Optionally, one host 110 serves as an agent server 170 with an analysis application 175 that analyzes the collected information to determine dependencies of IT components from each other in system 100, for example to identify components that may be responsible for problems in the enterprise application. Optionally, the dependencies may be used to build a configuration management database (CMDB) 155 (e.g. in database 160). The CMDB 155 represents an inferred structure of system 100 and dependencies between the components of the system 100.

In the context of the disclosure the following terms are defined as:

Host: Host 110 is an entity describing a physical or virtualized component such as a physical server (e.g. agent server 170), a workstation, a network device (e.g. a load balancer, router), and other hardware components supporting an application and communicating with other hosts 110 on a network.

Component: Component is an entity describing an applicative component such as an application server, database, and other software components of an application. A component might correspond to a software module, which includes one or more executable processes, along with a configuration file defining the configuration of the software module and, optionally, other supporting files such as but not limited to a database, temporary files, or default values.

Typical applicative components include but are not limited to databases (such as but not limited to Oracle, Sybase, DB2), application servers (such as but not limited to WebSphere Application Server, WebLogic), Web servers (such as but not limited to Apache, IIS), Directory servers, message buses, and load balancers. A single applicative component may serve multiple applications. It is appreciated that more than one applicative component, perhaps even serving more than one respective application, may reside on the same physical server or even virtual server. The term "Applicative" pertains to software; an applicative component may be hosted on other elements such as servers. An applicative entity comprises a piece of software that runs on one or more servers, either virtual or physical.

Configuration parameter: is a granular, non-complex item, which is a subset of a component whose value is a subject to change over time. Optionally, the configuration parameter 150 consists of a name-value pair. Configuration parameters 150 typically reside in configuration files, registries, object data manager database (IBM AIX) and others.

Dependency: Dependency is a relationship that exists between component A and component B when component A requires a service performed by component B in order to execute its function. Component A is called dependent and component B is called antecedent.

Architectural template: Architectural template is designed to serve as a generic map of dependencies between components in an enterprise application software. It represents a typical architectural pattern, for example, service-oriented architecture, multi-tier architecture, batch ETL (extraction transformation & loading), enterprise service bus architecture, event-driven architecture, micro-services, and blackboard architecture.

In some embodiments of the disclosure, instead of installing a dedicated agent application 130, the information is collected by standard API applications that are executed by the local operating system on the host 110 responsive to a request from agent server 170 or from other hosts 110. Optionally, agent server 170 polls the host 110 to extract the information instead of extracting the information directly from database 160, and then agent server 170 stores the information in database 160.

The configuration parameters 150 may include hardware details of the host 110, for example the amount of RAM, processor model, disk size, and models of devices attached. Optionally, the configuration parameters 150 may include firmware details, such as BIOS version, BIOS size and a checksum (e.g. CRC). Alternatively or additionally, the configuration parameters 150 may include details of application software installed on the host 110, including metadata (e.g. when installed and by whom) and application data.

The applications may include operating systems, client server applications, database applications, or corporate applications used by a corporation to support the corporate activity, for example the applications may include SQL servers and web servers.

Further additionally, configuration parameters 150 may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or affect of the software installed on the hosts 110. Optionally, the number of recorded parameters dealt with by IT system 100 may be anywhere from 1 to 10,000,000 or more.

In some embodiments of the disclosure, agent application 130 may be installed on one or more hosts 110 that are not continuously connected together over a network, for example at different organizations/clients. Optionally, the information may be stored locally and collected for example using an external disk, USB drive or by temporarily connecting the station to a wide area network such as the Internet and transmitting the information to database 160.

In an exemplary embodiment of the disclosure, three main processes are performed to determine a dependency score to identify dependency relationships in system 100, so that an administrator may be guided in dealing with problems in the system 100 (e.g. by being able to view an application dependency map). In an exemplary embodiment of the disclosure, the first process identifies hosts 110 and maps dependency of the hosts on each other. The second process uses a predesigned template that is tailored for a general enterprise application software (e.g. designed to fit the applications typically deployed by the enterprise). For example if the enterprise deals with sales they would usually have an inventory application that depends on a central database, which is accessed by many hosts. Likewise they would have a backup system and other common applications. The second process attempts to match the template to the actual enterprise configuration, by attempting to identify the hosts that perform each application. Optionally, an application may be performed by multiple hosts or multiple applications may be performed by a single host. The second process attempts to use the configuration parameters 150 and the previously determined host dependencies to identify which hosts perform which applications of the enterprise. The second process may provide many possible mapping solutions thus a third process is performed to evaluate a score for each piece of the mapping solutions to determine which solutions should be used for the final dependency map.

Figure 2:
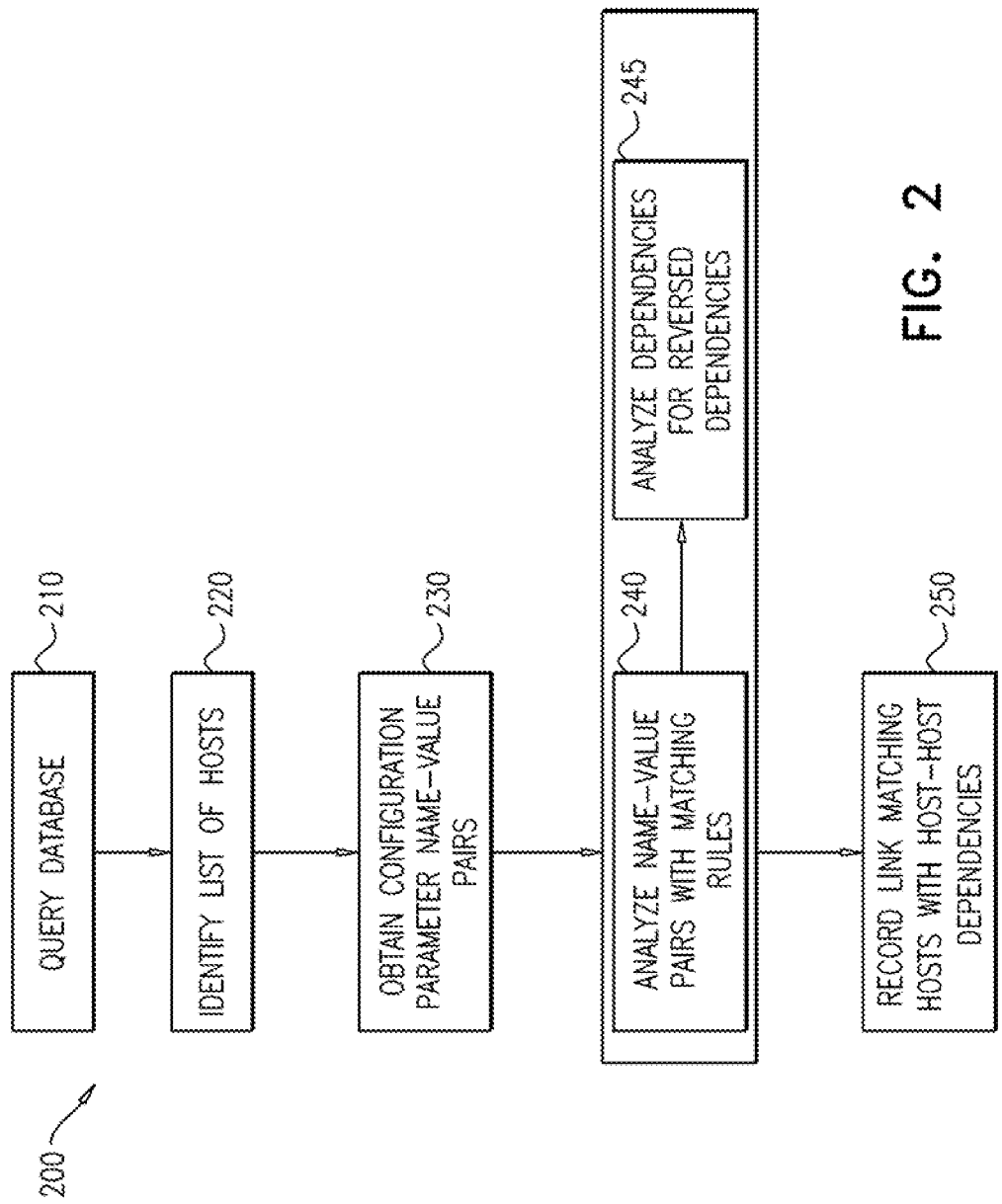
FIG. 2 is a flow diagram of a process of identifying dependencies between hosts, according to an exemplary embodiment of the disclosure.

FIG. 2 is a flow diagram of a first process 200 of identifying dependencies between hosts, according to an exemplary embodiment of the disclosure.

In an exemplary embodiment of the disclosure, database 160 is initially queried (210) to retrieve configuration parameters 150 collected, for example over a specific time period such as a day, a week, a month or a year. The configuration parameters 150 are analyzed to identify (220) a list of hosts 110. Additionally, the list of hosts 110 may be based on the network components on which agent application 130 was installed to collect the configuration parameters 150. Optionally, the name-value pairs of the configuration parameters 150 are sorted by host to obtain (230) configuration parameters 150 for each host.

In an exemplary embodiment of the disclosure, the name-value pairs of the configuration parameters 150 are analyzed (240) using pre-defined rules to determine if there is a match between hosts inferring a dependency between the hosts. It is assumed that if a host A depends on a host B, host A must contain properties from host B, such as host B's IP address or host B's name, in values of configuration parameters 150 located at host A. However, the reverse may be true as well. For example, if a host A grants File Transfer Protocol (FTP) access or a secure shell (SSH) access to host B, host A configuration parameters include host B's IP address. Such cases will be handled separately with predefined rules. Such dependencies are called reversed dependencies. In an exemplary embodiment of the disclosure, server 170 can keep two lists of matching rules specifying dependencies and reversed dependencies. We consider all possible combinations of the dependencies between hosts, and for each combination of a dependency between host A and host B, we check all the matching rules specifying dependencies. Such rule might include, for example, whether the IP address or name of host A is included in values of host B's configuration parameters 150. After determining that there is a dependency connection between two hosts the name-values are analyzed (245) to determine if the identified dependency relationship is a reverse dependency relationship by checking according to the predefined rules for reverse dependency. Such a rule might be, for example, if host A grants FTP or SSH access to host B, then dependency is reversed. If any of the reverse matching rules applies, a link indicating dependency pointing from host B to host A is recorded (250), for example in CMDB 155. In the case of non-reversed dependency, a link indicating dependency pointing from host B to host A is recorded (250). For example if host B appears in an "FTP approved host" configuration file on host A then a predefined rule would state that it indicates that host B is dependent on A. Likewise a configuration parameter with a single IP address generally indicates an access request, whereas a configuration parameter with multiple IP addresses generally indicates granting access.

Figure 3:
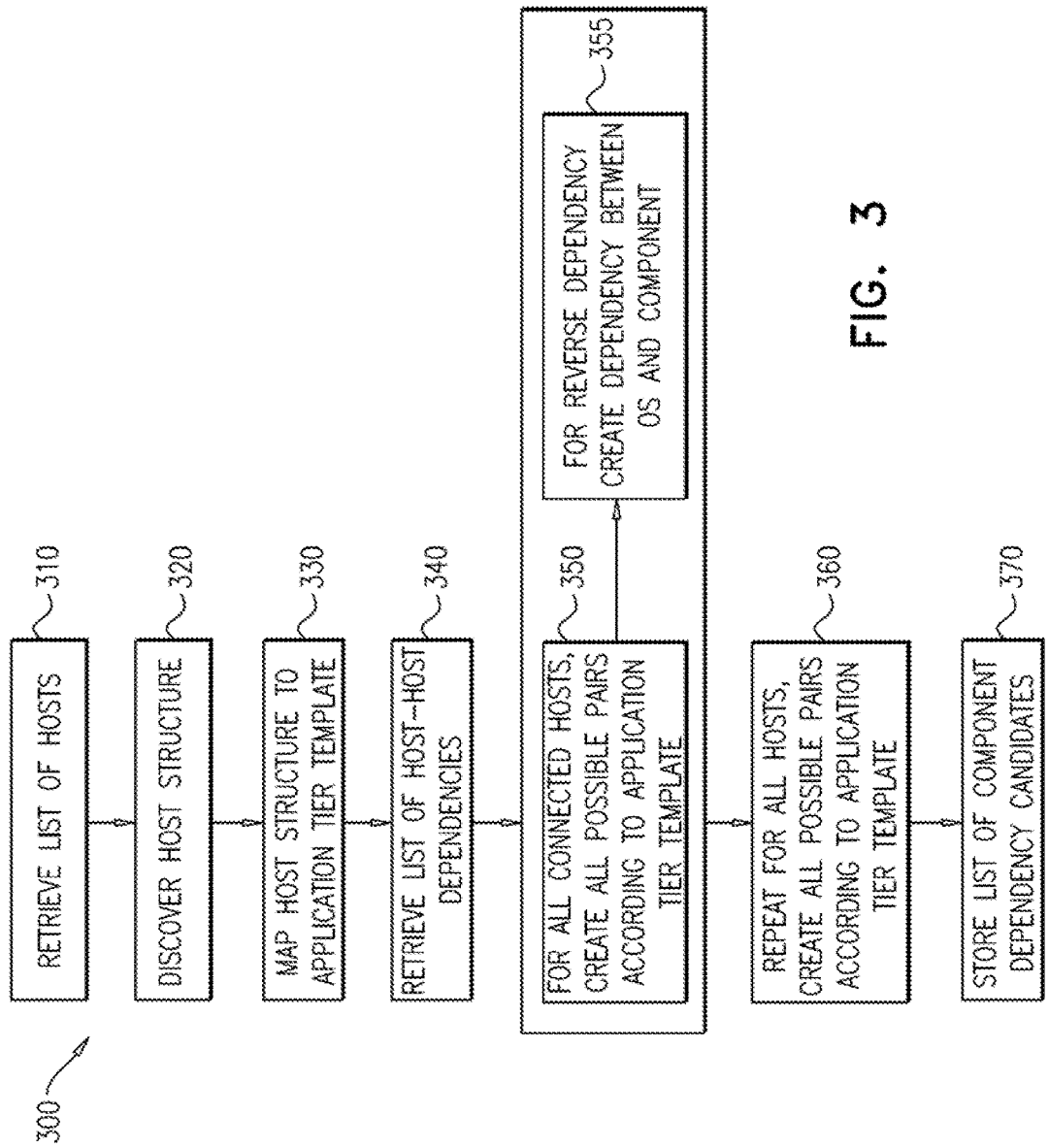
FIG. 3 is a flow diagram of a process of identifying candidate dependencies between IT components, according to an exemplary embodiment of the disclosure.

In an exemplary embodiment of the disclosure, after mapping dependencies between hosts 110 (including 170, 160) of network 120, a second process 300 is performed to enhance the dependency map based on templates (e.g. based on known connections that generally exist). FIG. 3 is a flow diagram of the second process 300 of identifying candidate dependencies between components, according to an exemplary embodiment of the disclosure.

In an exemplary embodiment of the disclosure, server 170 retrieves (310) the list of hosts that were previously identified. Optionally, each host is analyzed to discover (320) its structure. The structure of the host includes all the components of the host and a hierarchy of the components (e.g. applications depend on an operating system and the operating system depends on the basic IO system (BIOS)). In an exemplary embodiment of the disclosure, the structure is obtained based on the configuration parameters 150 collected by agent 130. Optionally, agent 130 analyzes the host 110 based on executing a set of predefined rules (defining what may be included in host 110) relative to the configuration parameters 150 actually collected at the host 110 and verifying if the expected items exist. Alternatively or additionally, the structure may be retrieved from previous analysis of the host 110 that is stored in database 160 as CMDB 155.

In an exemplary embodiment of the disclosure, agent 130 may scan the host's content periodically or on demand (e.g. in response to an event) and infer the structure based on the predefined rules. Optionally, the rules are manually created for each component defining for example how to determine properties of a component (e.g. a host 110) and how to extract information from configuration parameters 150 collected at the host. For example how to analyze configuration parameters 150 from configuration files collected at the host 110, from host properties and/or from different monitoring tools executed on the host 110. Optionally, during the above host analysis the configuration parameters 150 are stored in database 160 and the inferred structure is likewise stored in CMBD 155.

Figure 5:
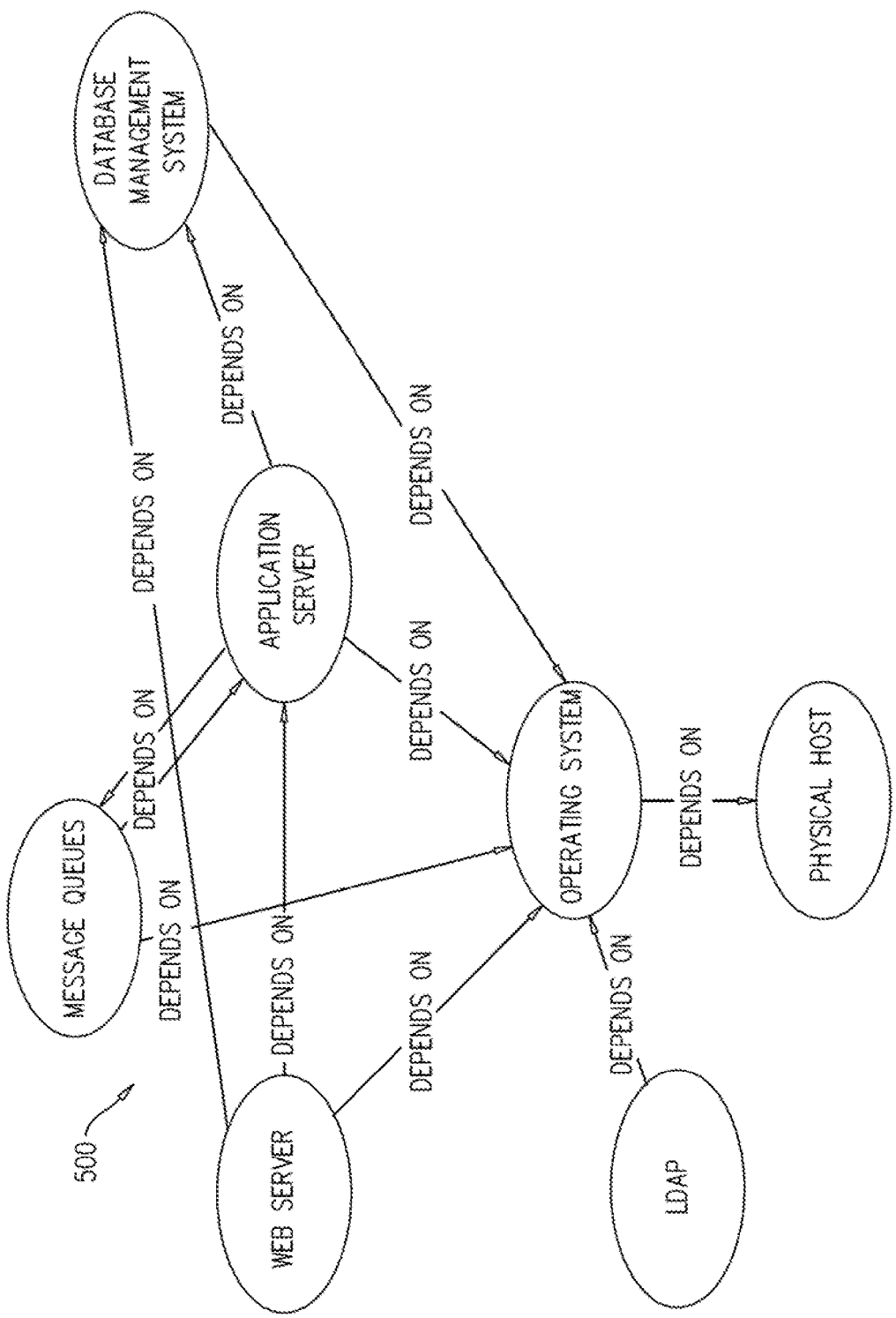
FIG. 5 is a schematic multi-tier architectural template for typical components in enterprise applications, according to an exemplary embodiment of the disclosure.

FIG. 5 is a schematic multi-tier architectural template 500 for a typical architecture of an enterprise software application, according to an exemplary embodiment of the disclosure. In an exemplary embodiment of the disclosure, a predefined template 500 designed for system 100 is used to analyze the hosts 11, wherein the template serves as a standard dependency map for applications 175 executed in a general enterprise network such as system 100 (e.g. defining that a general enterprise architecture includes a database management system that depends on the operating system used, and an application server depends on the database management system). The template defines for server 170 a general list of components and their dependencies, thus providing server 170 with a list of component dependencies that should be identified in system 100. Optionally, server 170 is provided with multiple types of templates for analyzing different types of architectural patterns (system 100) (e.g. service-oriented architecture, multi-tier architecture, batch ETL (extraction transformation & loading), enterprise service bus, event-driven architecture, micro-services, and blackboard architecture).

Figure 6:
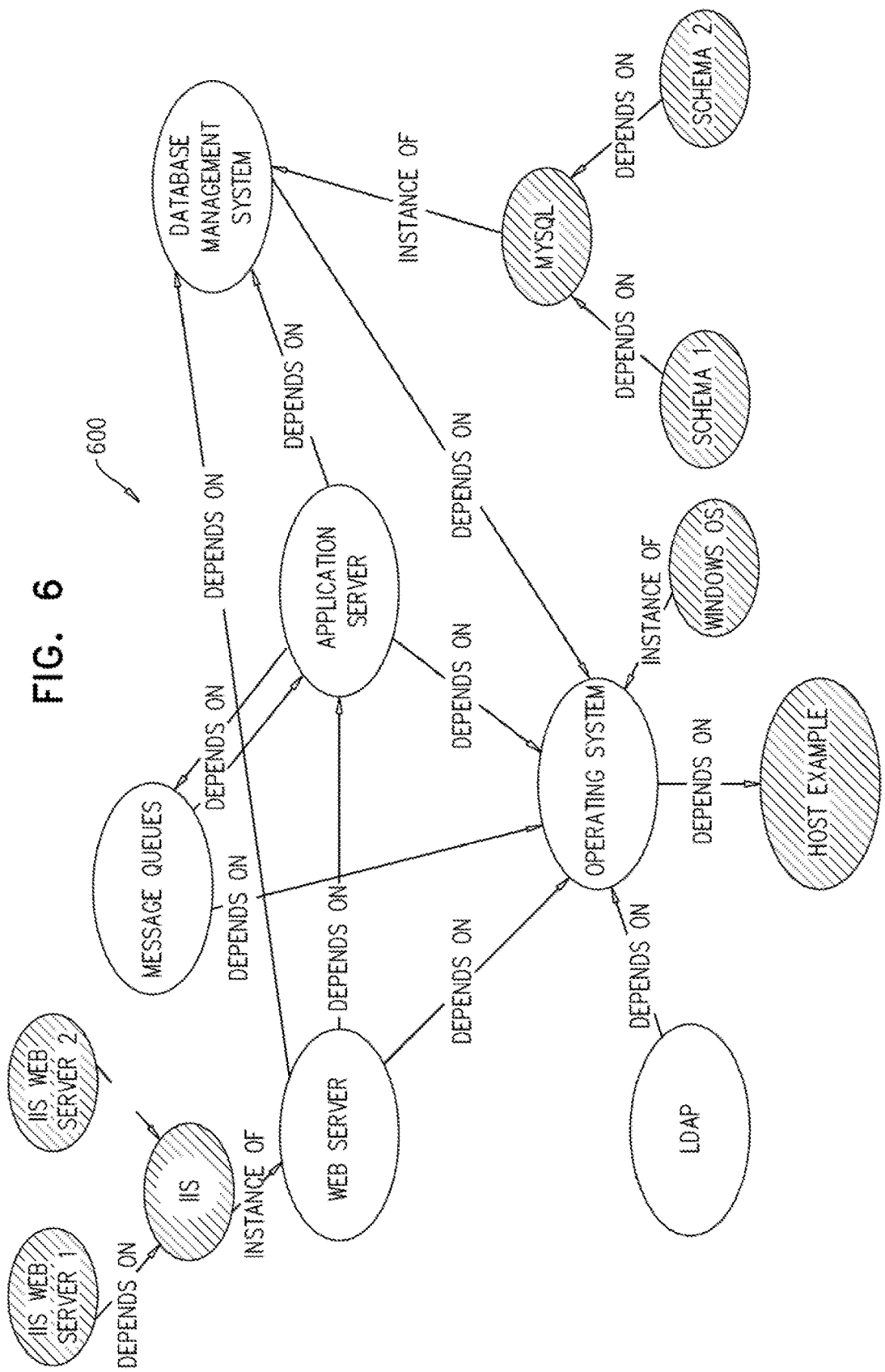
FIG. 6 is a schematic instance of a multi-tier architectural template for an exemplary enterprise application, according to an exemplary embodiment of the disclosure.

After discovering (320) the structure of a host server 170 attempts to map (330) the host structure to the template 500, for example identifying a position in the template matching the applications 175 on the host. Optionally, more than one position in the template may be a candidate position for mapping the specific host, for example if the host executes a database it may correspond to various database schemas in the template. In an exemplary embodiment of the disclosure, some mappings may be immediately ruled out due to mismatches/disagreements of hosts depending from the specific host. FIG. 6 is a schematic instance 600 of an application-tier template of an exemplary enterprise application, according to an exemplary embodiment of the disclosure. The results of using a general dependency template 500 on a specific host provide an instance 600 of use of the template. For example if a host has a Windows operating system installed, the node is matched to "Operating system". If the host has a MySQL database management system with two schemas, MySQL node is appended to Database Management System node, and both schemas to MySQL node. Similarly, we add IIS Web Server. In the instance 600, the link between a particular instance and its corresponding general IT component is denoted with "instance of". All other links are denoted with "depends on" since they reflect either a general dependency between general IT components or particular dependency between IT components.

In an exemplary embodiment of the disclosure, after mapping (3301) each host to candidate positions in template 500 the recorded list of host dependencies is retrieved (340). Optionally, for each dependency between two hosts, server 170 creates (350) as candidate mappings all possible dependency pairs between generic components (these are components that are the first children of general components) according to the architectural template 500. In the case of a reversed host dependency, for a dependency pointing from host A to host B, server 170 creates (355) a dependency between host A's generic IT component containing host B's IP address or name and host B's operating system with probability score p=1 (i.e. that it is assumed to be correct).

In an exemplary embodiment of the disclosure, the mapping is repeated (360) for all hosts 110, providing a list of candidate mappings of hosts 110 and their dependents according to template 500. Optionally, the resulting candidate dependency pairs are stored (370) in database 160 as a list of component dependency candidates.

Figure 4:
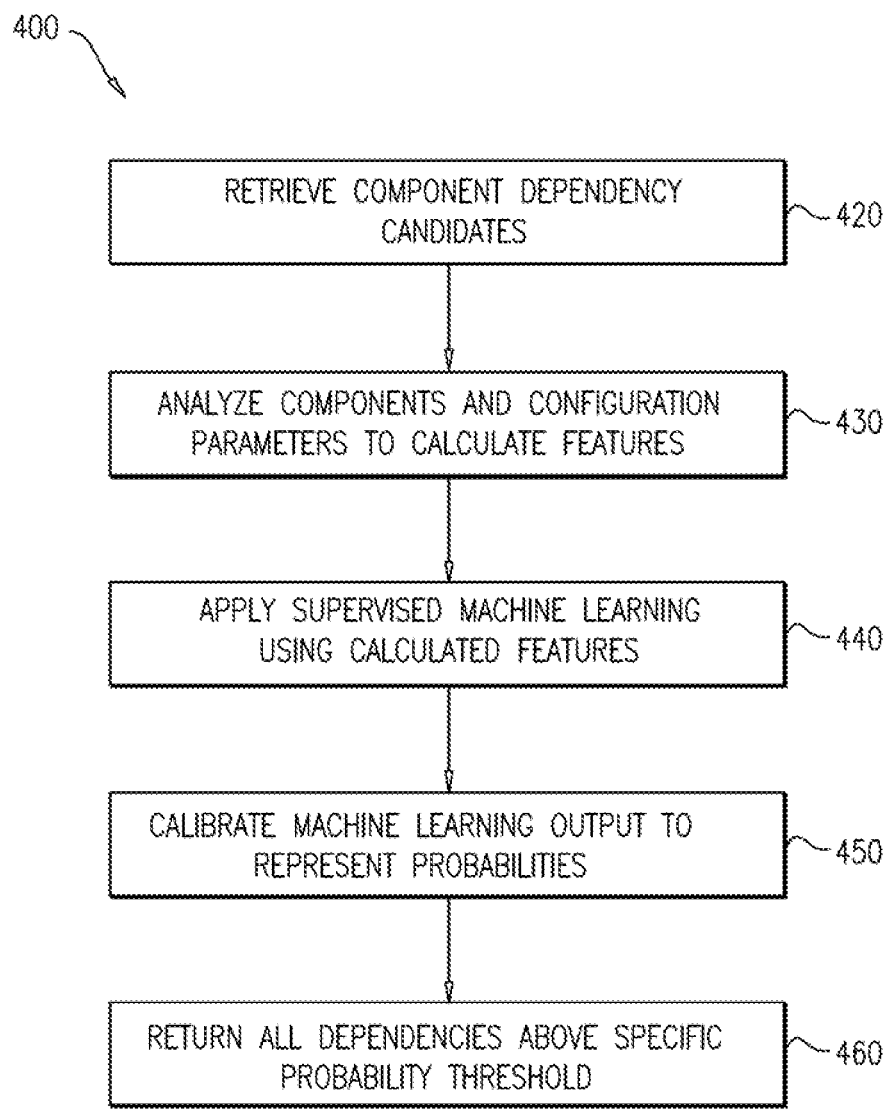
FIG. 4 is a flow diagram of a process of calculating a dependency score, according to an exemplary embodiment of the disclosure.

In an exemplary embodiment of the disclosure, after identifying candidate component dependencies, server 170 further analyzes the dependency pairs to determine a probability score that the dependency is correct. Some candidate mappings may contradict each other and cannot both be correct. FIG. 4 is a flow diagram of a third process 400 of calculating a dependency score, according to an exemplary embodiment of the disclosure.

In an exemplary embodiment of the disclosure, server 170 retrieves (420) the component dependency candidates identified above. Then server 170 analyzes (430) the components and associated configuration parameters to calculate features for a statistical model. Alternatively or additionally, one or more predefined matching rules for specifying dependencies between components are used. If parameters match one or more of these rule, we create a dependency with probability score p=1 (i.e. that it is assumed to be correct).

In an exemplary embodiment of the disclosure, dependency features for determining if a candidate mapping is correct (e.g. a probability score) include:

Dependency domain: tells us, whether the dependency is intra- or inter-domain. Intra-domain dependencies are the dependencies between components on the same host and inter-domain dependencies are dependencies between different hosts.

Inverse document frequency (idf) score: of a term, used in the dependent's technology. The idf score of a term t in a collection of documents is calculated as idf(t)=log (N/df(t)), where N is the number of documents in a collection, df(t) is a document frequency and is defined as a number of documents that contain term t. For very rare terms the idf score is very high and for frequent terms, it is very low. Term corresponds to a (delimited) IT component name, collection corresponds to the technology and document corresponds to an IT component with their recursive structure of children. The assumption of using idf score is that if an IT component's name is rare, it is more likely to form a dependency than the common, frequent IT component's names. These are usually names, that corresponds to the default names of databases, web servers etc.

Number of documents: number of documents in a collection, which corresponds to the number of IT components and their children belonging to a particular technology Host matching: tells us whether an antecedent's host alias or IP address or any other rule from the matching rules list appear in dependent and antecedent configuration parameters Host connection: tells us whether both hosts are connected with additional dependencies.

In an exemplary embodiment of the disclosure, features such as provided above are applied (440) in a supervised machine leaning algorithm. For example, one can use Naïve Bayes. Logistic Regression, Support Vector Machines or any other to learn conditional and prior probabilities on the training dataset and apply them in order to learn posterior probability of a dependency being a true one. Optionally, the machine learning output is calibrated (450) to represent the probabilities. Assuming Naïve Bayes is used as a supervised machine learning algorithm, then a function of f(x)=x can be used. Alternatively, logistic regression can be used to calibrate the probability. In an exemplary embodiment of the disclosure, all dependencies above a specific probability threshold are provided to the user. These dependencies, can be displayed to the user, stored to a database, exported to another application, etc. Optionally, the third process determines the most likely mapping, which then identifies what applications affect each other. In an exemplary embodiment of the disclosure, the determined mapping is used to locate application that may be the cause of malfunctions. Optionally, if an application fails it can be repaired/reinstalled or components that it depends from may be repaired/reinstalled.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of determining component dependencies in an enterprise application architecture implemented over an enterprise network, comprising:
    identifying structures of hosts connected to the network; wherein the hosts are physical or virtual entities that communicate with other entities over the network and execute applications, and the structures of the hosts include applications executed by the host and components of the applications;
    obtaining configuration parameters from said hosts;
    determining a mapping of dependencies between hosts based on the configuration parameters;
    receiving a template for identifying dependencies between components in the enterprise application architecture; wherein the template identifies typical applications, hosts and component dependencies that are expected to exist in the enterprise network;
    identifying candidate dependency mappings of applications, hosts and components based on the template that fit the determined mapping of dependencies between hosts;
    analyzing the candidate mappings to calculate a probability score for the candidate mappings that they are correct mappings;
    output the candidate mappings having the highest score;
    based on the output candidate mappings, repairing or reinstalling applications that a failed component depends from to repair the failed component.

2. The method of claim 1, wherein the determined dependencies between hosts are analyzed to identify reverse dependencies.

3. The method of claim 1, wherein identifying dependencies between hosts are based on predefined rules applied to the configuration parameters.

4. The method of claim 1, wherein different templates are used for different enterprise architectural patterns.

5. The method of claim 1, wherein some candidate mappings of hosts based on the templates are ruled out due to a disagreement with host pairs of the mapping of dependencies between hosts.

6. The method of claim 1, wherein the probability score is affected by the mappings corresponding to dependencies of applications that are on the same host relative to dependencies of components that are executed on more than one host.

7. The method of claim 1, wherein the probability score is affected by rarity of the name of the underlying components.

8. The method of claim 1, wherein the probability score is calculated by a machine learning algorithm.

9. The method of claim 1, wherein the candidate mappings are used to signify what components should be repaired or reinstalled.

10. A non-transitory computer readable medium for storing program code to execute the method according to claim 1.

11. A system for determining component dependencies in an enterprise application architecture implemented over an enterprise network, comprising:
- an agent application configured to collect configuration parameters of applications executed on hosts and their components connected to the enterprise network;
- a database configured to store the collected configuration parameters;
- a template of component dependencies in the enterprise application architecture; wherein the template identifies typical applications, hosts and component dependencies that are expected to exist in the enterprise network;
- a server configured to perform the following:
   - a. identify structures of hosts; wherein the hosts are physical or virtual entities that communicate with other entities over the network and execute applications, and the structures of the hosts include applications executed by the host and components of the applications;
   - b. determine a mapping of dependencies between hosts based on the configuration parameters;
   - c. identify candidate dependency mappings of applications, hosts and components based on the template that fit the determined mapping of dependencies between hosts;
   - d. analyze the candidate mappings to calculate a probability score for the candidate mappings that they are correct mappings;
   - e. output the candidate mappings having the highest score;
   - f. based on the output candidate mappings, repairing or reinstalling applications that a failed component depends from to repair the failed component.

12. The system of claim 11, wherein the determined dependencies between components of hosts are analyzed to identify reverse dependencies.

13. The system of claim 11, wherein identifying dependencies between hosts are based on predefined rules applied to the configuration parameters.

14. The system of claim 11, wherein different templates are used for different enterprise architectural patterns.

15. The system of claim 11, wherein some candidate mappings of hosts based on the templates are ruled out due to a disagreement with host pairs of the mapping of dependencies between hosts.

16. The system of claim 11, wherein the probability score is affected by the mappings corresponding to dependencies of applications that are on the same host relative to dependencies of components that are executed on more than one host.

17. The system of claim 11, wherein the probability score is affected by rarity of the name of the underlying components.

18. The system of claim 11, wherein the probability score is calculated by a machine learning algorithm.

19. The system of claim 11, wherein the candidate mappings are used to signify what components should be repaired or reinstalled.

* * * * *